3,328,208
LEAD STORAGE BATTERY WITH SOLIDIFIED ELECTROLYTE AND PROCESS OF MAKING SAME
Guenther Ryhiner, deceased, late of Bad Soden im Taunus, Germany, by Anita Ryhiner, executrix, Bad Soden im Taunus, Germany, and Ernst Voss and Alexander Koenig, Frankfurt am Main, Germany, assignors to Varta Aktiengesellschaft, Frankfurt am Main, Germany, a corporation of Germany
No Drawing. Filed Apr. 24, 1964, Ser. No. 363,066
Claims priority, application Germany, Apr. 25, 1963, V 23,983
12 Claims. (Cl. 136—157)

The present invention relates to lead storage batteries with solidified or thickened electrolyte, to such a solidified electrolyte, and to a process of making such lead storage batteries and solidified electrolyte.

Lead storage batteries with solidified or, respectively, thickened electrolyte are known. To solidify or, respectively, thicken the electrolyte, compounds of the silicic acid type were used. For instance, silica gel obtained from water glass or from organic derivatives of silicic acid was employed for this purpose. Furthermore, it is known to produce thickened electrolytes by means of large-surface silicon dioxide. Pumice, asbestos, gypsum, lead sulfate, and sawdust are also known as thickening agents.

All these known thickening agents, however, have the disadvantage that they decrease the conductivity of the electrolyte. As a result thereof the internal resistance of the storage battery is increased so that the battery, on load application, shows unfavorable voltage characteristics.

A further disadvantage of the known solidified or, respectively, thickened electrolytes, is their tendency to shrink even after a short period of operation. Such shrinkage results in diminished contact between the active material and the electrolyte.

The commonly used thickened electrolytes have the additional disadvantage that their viscosity is so high that they do not completely fill the space between the electrodes and more particularly the pores of the electrodes. This again prevents the required intimate contact between electrolyte and active material.

To avoid these disadvantages it has already been proposed to add pectin to the battery acid. For this purpose a mixture of pectin and battery acid is allowed to solidify to a gel in the battery; or previously manufactured sheets consisting of a supporting grid filled with pectin gel are inserted, together with the plate set, into the battery container.

According to another proposal, the electrode plates and the separators were first impregnated with sulfuric acid and then immersed in a pectin solution. Due to the action of the acid the sol solidifies in the spaces between the electrode to a gel.

It is one object of the present invention to provide storage batteries with solidified or thickened electrolyte which batteries are free of the disadvantages of the heretofore used storage batteries with solidified or thickened electrolyte and have an extremely low electric internal resistance.

It is another object of the present invention to provide a simple and effective process of producing such a storage battery with a solidified or thickened electrolyte.

A further object of the present invention is to provide solidified electrolyte gels to be inserted between the electrodes which electrolyte gels may also serve as separators.

Other objects of the present invention and advantageous features thereof will become apparent as the description proceeds.

In principle the present invention consists in providing, in place of the conventional separators, between the electrode plates foils or sheets which consist substantially of a pectin-sulfuric acid gel and of synthetic and/or natural rubber or a thermoplastic material such as, for instance, polyisobutylene, polyethylene, polyvinylchloride, polypropylene, or copolymers thereof. The softening point of the thermoplastic material must be below the decomposition temperature of the pectin. In addition to these components, the foils or sheets may contain filler materials such as, for instance, large-surface silicon dioxide.

These foils or sheets are made by preparing a mixture of dried pectin, the thermoplastic material or, respectively, rubber, and, if desired, a suitable filler material. Said mixture is processed to foils or sheets, for instance, by rolling or by means of extrusion or injection molding.

Such foils or sheets are arranged between the electrode plates, in place of the separators. The complete plate sets are then inserted into the storage battery container. The container may either contain the required amount of battery acid before the plate sets are inserted or the battery acid may be filled into the container having inserted therein the plate sets. The action of the acid converts the dried pectin to a pectin-sulfuric acid gel which acts as electrolyte in the resulting storage battery. Excess sulfuric acid may be decanted.

Simultaneously with gel formation, swelling of the foils or sheets takes place so that their thickness increases to about three times their initial thickness. As a result of this increase in thickness the solidified electrolyte is pressed firmly against the electrode plates so that intimate contact between electrolyte and active material is achieved and is maintained during operation of the storage battery.

Storage batteries made according to the present invention are advantageously distinguished from known storage batteries by an extremely low internal resistance. For instance, the electric resistance of battery acid of density of 1.28 g./cc. is 1.24 ohm/cm. When inserting conventional wood separators, the internal resistance is increased by about 400%; even when inserting the most modern sinter separators, this increase in internal resistance amounts to about 40%. In contrast thereto, when using solidified gels of electrolyte according to the present invention, the electric internal resistance of the storage batteries exceeds the internal resistance of storage batteries operating with pure battery acid without any separator only by about 10%. As a result thereof a storage battery according to the present invention exhibits especially favorable voltage characteristics on load application and requires an extremely low end of charge voltage which is about 0.1 volt per cell lower than that of conventional cells.

The following examples serve to illustrate the preparation of the electrolyte foils according to the present invention and their use in storage batteries without, however, being limited thereto.

*Example 1*

3 g. of polyisobutylene and 3 g. of apple pectin are mixed on a friction roller and rolled to yield foils of 0.3 mm. thickness. After cutting the foils to the desired size, they are placed, like separators, between electrode plates of opposite polarity. The thus obtained plate sets are immersed into the containers filled with the required amount of battery acid or, respectively, battery acid is poured over the plate sets to impregnate the pectin foils with acid and the thus treated plate sets are installed in the cell. The resulting pectin-sulfuric acid gel functions as solidified electrolyte.

Example 2

3 g. of polyisobutylene, 3 g. of pectin, and 3 g. of silicon dioxide are mixed on a friction roller. The mixture is rolled to sheets of 0.3 mm. thickness. Said foil are used as solidified electrolyte in the same manner as described above.

Example 3

The procedure is the same as described in Example 1 whereby, however, 2 g. of polyethylene and 4 g. of pectin are used.

Example 4

The procedure is the same as described in Example 1 whereby, however, 3.5 g. of polyvinyl chloride and 2.5 g. of pectin are used.

Example 5

The procedure is the same as described in Example 2 whereby, however, 4 g. of synthetic butadiene-styrene rubber and 2 g. of pectin are used.

Example 6

The procedure is the same as described in Example 2 whereby, however, 3 g. of polypropylene and 3 g. of pectin are used.

Preferably the pectin and the rubber or thermoplastic material are used in finely pulverized form to permit ready gel formation by the battery acid.

The proportion of pectin to thermoplastic material or rubber may vary. Satisfactory results are achieved with a proportion of pectin to thermoplastic material or rubber between about 2:1 and about 1:2 and preferably of about 1:1.

The amount of filler material to be added may also vary. It should preferably not exceed the amount of pectin and thermoplastic material or rubber. An amount of about 30% to 40% of the total mixture is the preferred amount.

While the invention has been described in connection with certain embodiments thereof, it will be clearly understood that many modifications and variations may occur to the skilled in the art without departing from the principle set forth herein and in the appended claims.

We claim:

1. Lead storage battery comprising a container, electrode plates of opposite polarity, and sandwiched between said electrode plates, a foil-like solidified electrolyte gel composed of pectin, a supporting material selected from the group consisting of natural and synthetic rubber and a thermoplastic plastic material having a softening point below the decomposition temperature of pectin, and sulfuric acid in an amount sufficient to cause swelling of the pectin and to convert it into a solidified gel.

2. Lead storage battery according to claim 1, wherein the pectin is apple pectin.

3. Lead storage battery according to claim 1, wherein the thermoplastic plastic material is polyethylene.

4. Lead storage battery according to claim 1, wherein the thermoplastic plastic material is polyvinylchloride.

5. Lead storage battery according to claim 1, wherein the thermoplastic plastic material is polypropylene.

6. Lead storage battery comprising a container, electrode plates of opposite polarity, and sandwiched between said electrode plates, a foil-like solidified electrolyte gel composed of pectin, a supporting material selected from the group consisting of natural and synthetic rubber and a thermoplastic plastic material having a softening point below the decomposition temperature of pectin, a filler material, and sulfuric acid in an amount sufficient to cause swelling of the pectin and to convert it into a solidified gel.

7. Lead storage battery according to claim 6, wherein the filler material is silicon dioxide of large surface area.

8. In a process of making a lead storage battery substantially free of liquid electrolyte, the steps which comprise intimately mixing pulverulent dried pectin and a supporting material selected from the group consisting of natural and synthetic rubber and a thermoplastic plastic material having a softening point below the decomposition temperature of pectin, processing said mixture to foils, sandwiching said foils between the electrode plates, and impregnating the foils with battery acid in an amount sufficient to produce a swollen pectin gel.

9. In a process of making a lead storage battery substantially free of liquid electrolyte, the steps which comprise intimately mixing pulverulent dried pectin, a supporting material selected from the group consisting of natural and synthetic rubber and a thermoplastic plastic material having a softening point below the decomposition temperature of pectin, and a filler material of large surface area, processing said mixture to foils, sandwiching said foils between the electrode plates, and impregnating the foils with battery acid in an amount sufficient to produce a swollen pectin gel.

10. A pectin foil for use as solidified electrolyte in storage batteries, said foil being composed of pectin and a supporting material selected from the group consisting of natural and synthetic rubber and a thermoplastic plastic material having a softening point below the decomposition temperature of said pectin, said foil, on impregnation with battery acid, forming a swollen gel.

11. A pectin foil for use as solidified electrolyte in storage batteries, said foil being composed of pectin, a supporting material selected from the group consisting of natural and synthetic rubber and a thermoplastic plastic material having a softening point below the decomposition temperature of said pectin, and a filler material, said foil, on impregnation with battery acid, forming a swollen pectin gel.

12. A lead storage battery comprising, in a container, electrode plates of opposite polarity, and sandwiched and pressing in firm contact against the electrode plates a foil-like pectin-sulfuric acid electrolyte gel comprising a mixture of pectin and a supporting material selected from the following: natural and synthetic rubber and a thermoplastic plastic material having a softening point below the decomposition temperature of pectin.

References Cited

UNITED STATES PATENTS

| | | | |
|---|---|---|---|
| 394,617 | 12/1888 | Roberts et al. | 136—142 |
| 2,542,052 | 2/1951 | Owens et al. | 260—209.5 X |

FOREIGN PATENTS

| | | |
|---|---|---|
| 54,494 | 5/1943 | Netherlands. |

WINSTON A. DOUGLAS, *Primary Examiner.*

D. L. WALTON, *Assistant Examiner.*